(12) United States Patent
Hart

(10) Patent No.: US 7,051,554 B2
(45) Date of Patent: May 30, 2006

(54) TIGHTENING A FIBER ROLL COVER

(75) Inventor: Charles M. Hart, New Castle, PA (US)

(73) Assignee: Global Consulting, Inc., New Castle, PA (US)

( * ) Notice: Subject to any disclaimer, the term of this patent is extended or adjusted under 35 U.S.C. 154(b) by 0 days.

(21) Appl. No.: 10/750,429

(22) Filed: Dec. 31, 2003

(65) Prior Publication Data

US 2005/0138968 A1    Jun. 30, 2005

(51) Int. Cl.
*C03B 13/16*    (2006.01)

(52) U.S. Cl. .................. 65/370.1; 65/374.1; 65/374.13; 65/275; 65/348; 492/48; 492/50; 492/53; 492/59; 198/780; 193/37; 428/64.1

(58) Field of Classification Search ............... 65/370.1, 65/374.1, 374.13, 275, 253, 348; 29/132, 29/895; 432/60, 236; 198/780; 193/37; 492/48, 50, 53, 59; 428/64.1
See application file for complete search history.

(56) References Cited

U.S. PATENT DOCUMENTS

| | | | |
|---|---|---|---|
| 3,116,053 A | 12/1963 | Ericsson | |
| 3,802,495 A | 4/1974 | Hordis | |
| 3,807,982 A | 4/1974 | Claassen et al. | |
| 4,167,997 A | 9/1979 | Revells | |
| 4,459,148 A | 7/1984 | Diederen et al. | |
| 5,205,398 A | 4/1993 | Hart et al. | |
| 5,307,563 A | 5/1994 | Svenka | |
| 5,378,219 A | 1/1995 | Hart et al. | |

FOREIGN PATENT DOCUMENTS

| | | |
|---|---|---|
| DE | 195 04 044 | 9/1995 |
| EP | 0 473 926 A2 | 3/1992 |

*Primary Examiner*—Mark Halpern
(74) *Attorney, Agent, or Firm*—Renner, Otto, Boisselle & Sklar, LLP

(57) ABSTRACT

Rolls for generally conveying sheets, such as of steel or glass over a roller typically have a steel mandrel and fiber-containing roll cover, with the fiber roll cover pressed between end plates. In a roll end assembly including the end plates there is now provided an axial shaft beyond the end plate. The shaft incorporates a roll compression means. The compression means includes a compression element which element engages the end plate. Pressure from the compression means, which may be exerted from beyond the shaft, can thereby be transmitted to the fiber roll.

4 Claims, 4 Drawing Sheets

TIGHTENING A FIBER ROLL COVER

BACKGROUND OF THE INVENTION

1. Field of the Invention

The invention relates to rolls such as for glass manufacturing. The rolls can convey hot slabs or sheets, as of glass. The rolls typically comprise a steel mandrel and an insulating refractory cover. The cover may be made from materials including refractory fiber, such as ceramic fiber, or compressed millboard. The end assembly of the roll can maintain the roll in compression.

2. Description of the Prior Art

Insulating materials for use in high temperature applications were historically made from asbestos. A roller conveyor can be made with an inner metal shaft and an outer insulating cover. Asbestos discs can be stacked onto the shaft, and pressed together axially, as discussed, for example, in U.S. Pat. No. 3,802,495. The discs can also be pressed together by hydraulic means as taught in U.S. Pat. No. 3,116,053.

Ceramic fiber has been successfully used as a replacement for asbestos in certain applications. For example, it is taught in U.S. Pat. Nos. 5,205,398 and 5,378,219 to use ceramic fiber as a roll cover. Annular discs of bulk ceramic fiber are stacked onto an inner metal shaft and may be axially compressed at greater than about 50 percent of the fiber's original density. The compressed discs on the metal shaft may be perfused with colloidal silica and dried. The discs are then recompressed and held permanently in compression.

A compression set can be a problem in a refractory fiber roll cover that is held in compression. Compression set is the tendency of a material to shrink under heat and compressive load. Along the axis of the roll, compression set causes the cover to lose its resiliency and rigidity, both of which are necessary to support slabs or sheets.

Prior practice has generally compensated for compression set by stopping production and replacing the affected rolls. Affected rolls can be reconditioned by unlocking the end plate, recompressing the fiber, and locking the end plate. The reconditioned roll is then ready for reuse.

Also, U.S. Pat. No. 5,307,563 teaches a method of making a roll comprising a mandrel covered by a plurality of resin-impregnated, fibrous discs. Threaded washers tighten along the longitudinal axis of the mandrel to compress the fibrous discs until the resin hardens. However, the patent does not describe tightening after hardening of the resin.

SUMMARY OF THE INVENTION

There is now disclosed a compressed refractory fiber roll cover. The present invention solves the problem of 'compression set' in a refractory fiber roll cover. Compression set is the tendency of a material to shrink under a compressive load and heat. Along the long axis of the roll, compression set causes the cover to lose its resiliency and rigidity, both of which are necessary to support slabs or sheets.

The present invention compensates for compression set while the roll is in operation. Savings to manufacturers can occur from improved efficiency and economy of operation. The end assembly can include a shaft positioned along the axis of the roll and generally outwardly away from the roll. A long, axial compression means can be used in conjunction with the axial shaft. Through this assembly, compressive force can be exerted from a source external to the roller end assembly, onto an end plate of the roll, and then to the fiber cover. Also, positioning means such as setscrews may be used to prevent unwanted movement of the compression means.

In one aspect, the invention is directed to a roll structure having a fiber-containing roll cover over a mandrel, which roll structure has at least one end assembly comprising an end plate pressed against the fiber-containing roll cover, a compression element spaced apart from the roll cover by the end plate and abutting against the end plate. The end assembly also compresses a shaft spaced apart from the roll cover on a side of the end plate opposite the roll cover, and elongated compression means at least substantially housed within the shaft which compression means exerts pressure against the compression element.

In another aspect, the invention is directed to a compression assembly for a fiber roll cover including a shaft having an elongated axial length, which shaft is positioned outwardly away from the roll cover, an elongated axial compression means housed within the shaft, a roll cover end plate and means for communicating compressive force from the elongated compression means to the end plate.

In yet a further aspect, the invention is directed to the method of compressing the fiber of a fiber-containing roll cover having a roll end assembly including an end plate in contact with the fiber-containing roll cover, which method comprises establishing a shaft spaced outwardly away from the roll cover along the axis of the roll, providing compression means associated with the shaft, providing a compression element between the end plate and the compression means, and engaging the compression means with the compression element, while engaging the compression element with the end plate, whereby compressive force from the compression means is transmitted through the compression element and the end plate to the fiber cover.

In a final aspect, the invention is directed to a roll structure having a fiber-containing roll cover over a mandrel, which roll structure has at least one end assembly comprising an end plate pressed against the fiber containing roll cover, a compression element spaced apart from the roll cover by the end plate and abutting against the end plate, a shaft spaced apart from the roll cover on a side of the end plate opposite the roll cover, and compression means housed within the shaft, the compression means comprising, (a) an elongated rod, (b) a first plate disposed at an end of the rod opposite an external end of the rod, (c) a plurality of springs, and (d) a second plate abutting the compression element, wherein the compression means exerts pressure against the compression element and said end plate to said fiber cover.

DESCRIPTION OF THE PREFERRED EMBODIMENTS

Figure 1:
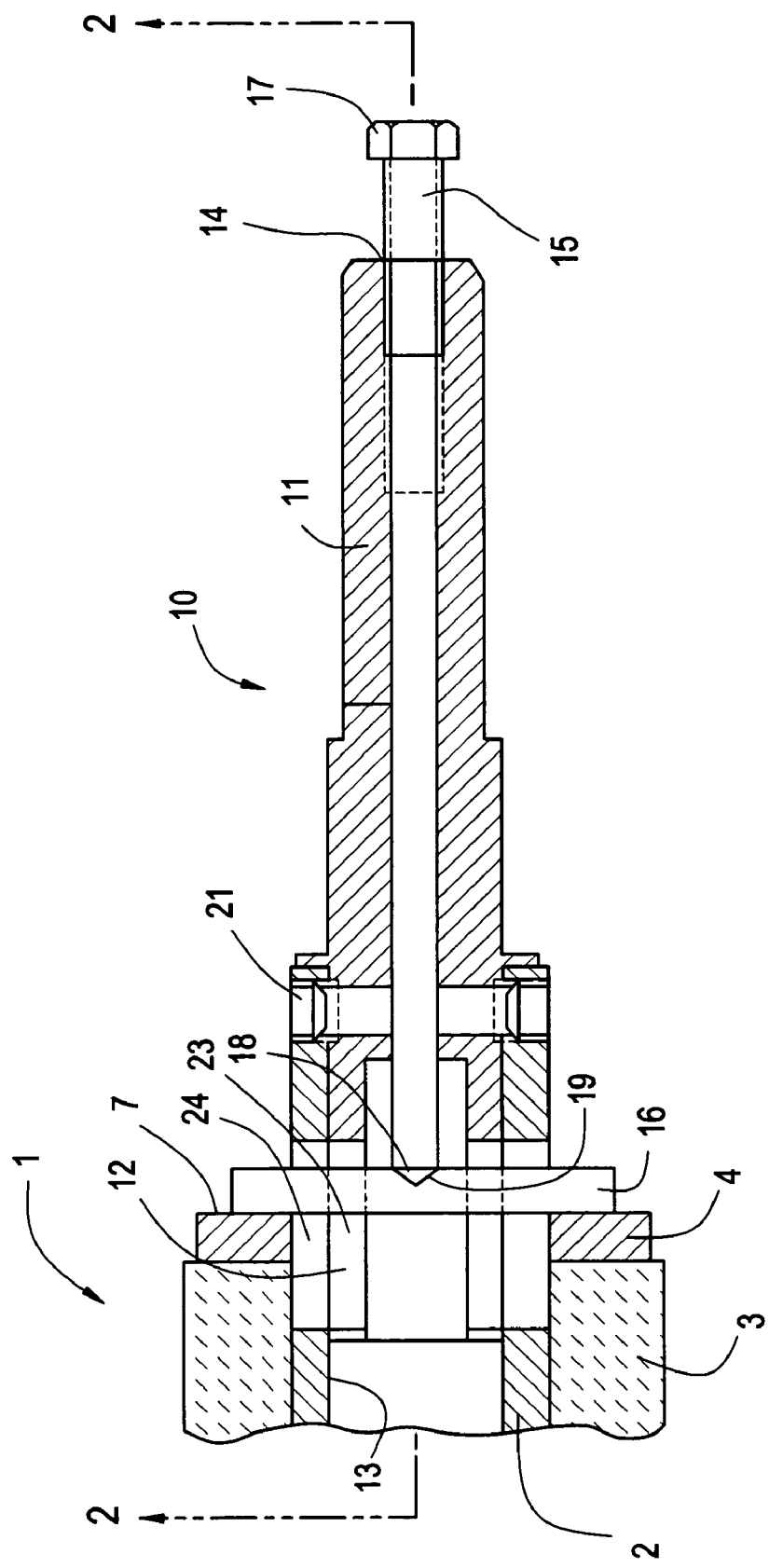
FIG. 1 is a view in section of a portion only of an insulating roll having an end assembly of the present invention that includes screw compression means that is substantially housed within an axial borehole of an end shaft.

The fiber-containing rolls can find use such as in glass manufacturing. However, they may also be utilized in other processes including metal conveying. The articles in contact with the rolls are typically in the form of slabs or sheets and may be conveyed over the rolls. Metals that may be so processed include steel, aluminum and copper.

For the fiber useful in the fiber-containing roll cover, and which may often be referred to simply as the 'refractory fiber', there will generally be used some ceramic fiber, e.g., from about 20 weight percent. However, it is contemplated that for such refractory fiber there may be simply used other refractory fibers, which can be synthetic or natural mineral fiber, e.g., synthetic fibers such as glass fiber or carbon fiber, or natural mineral fibers such as asbestos, mineral wool, including mineral wool with additives, or sepiolite, or wallastonite, or fiber mixtures including these natural mineral fibers. However, since the refractory fiber will most always be some, to all, of ceramic fiber, reference herein for convenience may be made simply to ceramic fiber.

The ceramic fiber may be other than a silica-containing fiber, as represented by an alumina fiber or fiber of boron compound material, e.g., fibers of boron oxide, boron carbide or boron nitride. It is preferred for economy that the ceramic fiber be a silica-containing fiber. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like.

Some roll covers may use a binder in the fiber roll cover. Representative binders include starch, latex materials and cellulosic substituents, e.g., an aqueous suspension of cellulose methyl ether. The word 'binder' may also refer to a substance which will not readily penetrate into the compressed fiber roll, such as by wicking, in appreciable amount. These binders may sometimes be referred to herein as 'inorganic binders'. Representative inorganic binders include cements, calcium aluminate and clays. Thus, the roll cover may be a millboard and contain a major amount or more, e.g., up to 80 weight percent, of binder.

If the material used is capable of impregnating the fiber-containing roll, i.e., wicking into the roll, as well as also leaving a residue within the roll on drying, such material is referred to herein for convenience as a 'rigidizer'. Representative rigidizers are such as colloidal silica, colloidal alumina, colloidal zirconia, or similar liquid materials. Where the rigidizer used is in colloidal form, it may be referred to herein as a 'colloidal rigidizer'. The rigidizer may be applied to the fiber to penetrate the fiber, e.g., penetrate completely throughout the fiber. It is however to be understood that penetration may purposefully be limited, such as to only an outermost layer of the compressed ceramic fiber.

It will be understood that when the fiber of the roll cover is a ceramic fiber, the ceramic fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing, e.g., for high alumina fibers. As the word is used herein, 'shot' refers to the non-fibrous, and usually chunky, ceramic particles that are found in accumulated ceramic fiber, e.g., ceramic fiber blanket. Although serviceable fiber can contain shot, the ceramic fiber may also be processed to have a reduced shot content, e.g., be virtually shot-free. A particularly serviceable ceramic fiber has a $SiO_2$ content of 54 weight percent, an $Al_2O_3$ content of 43.5 weight percent, an $Fe_2O_3$ content of 1.5 weight percent, and one weight percent balance of residual oxides.

For the refractory fiber, such as for ceramic fibers as they are produced, it will be typical that they can be accumulated together. Such may simply be by pressing loose fiber into accumulated form. Accumulated fiber may be fiber accumulated into mats. The mats may have a density on the order of from about 2 to about 8 pounds per cubic foot. These mats, often by further consolidation, may be made into blankets that will have typically a density on the order of from about 4 to 10 pounds per cubic foot for ceramic fiber. As bulk fiber, or as mats or blankets, the refractory fiber is simply referred to herein for convenience as being in 'accumulated' form.

The individual fibers in accumulated form, particularly for ceramic fibers, may be of varying lengths. All fibers will typically have a length of at least about 0.5 inch, with long fibers usually having length within the range of from about 8 inches up to a length of about 10 inches. A more typical fiber mixture for fibers of varying lengths has some individual short fibers at least about 1 to 4 inches long, in mixture with long fibers.

The accumulated fiber may then be utilized for making an insulating, fiber-containing roll cover. For example, blanket or mat fiber can be stamped or cut into disc shape and bundles of these discs can be formed into such insulating rollers. Suitable such insulating rollers have been shown in U.S. Pat. No. 5,989,170, which is herein incorporated by reference.

Referring then to the figure, FIG. 1 shows an end portion only of a roll 1 comprised of a hollow metal mandrel 2 having a fiber cover 3. The fiber cover 3 is contained within end plates 4. The metal mandrel 2 is supported, may be rotationally driven, and may be internally cooled, all by means not shown. The end plates 4 maintain compression on the fiber cover 3.

As representative of the present invention there is then depicted in the Figure a roll end assembly 10 extending outwardly away from the roll 1. The roll end assembly 10 comprises a shaft 11. The shaft 11 has an end positioned internally within the mandrel 2 whereby the outer surface 12 of the portion of the shaft 11 at this one end can engage the inner surface 13 of the hollow mandrel 2. The shaft 11 has an elongated borehole 14 that extends throughout the shaft 11 in the axial direction of the roll 1. Within the borehole 14 is a rod 15 that serves as compression means. For example, the rod 15 may be externally threaded (not shown) and the borehole 14 internally threaded (not shown), with the threads engaging, whereby rotation of the rod 15 can be utilized to provide a compression force. Such force can be exerted on a pin 16 serving as a compression element.

Figure 2:
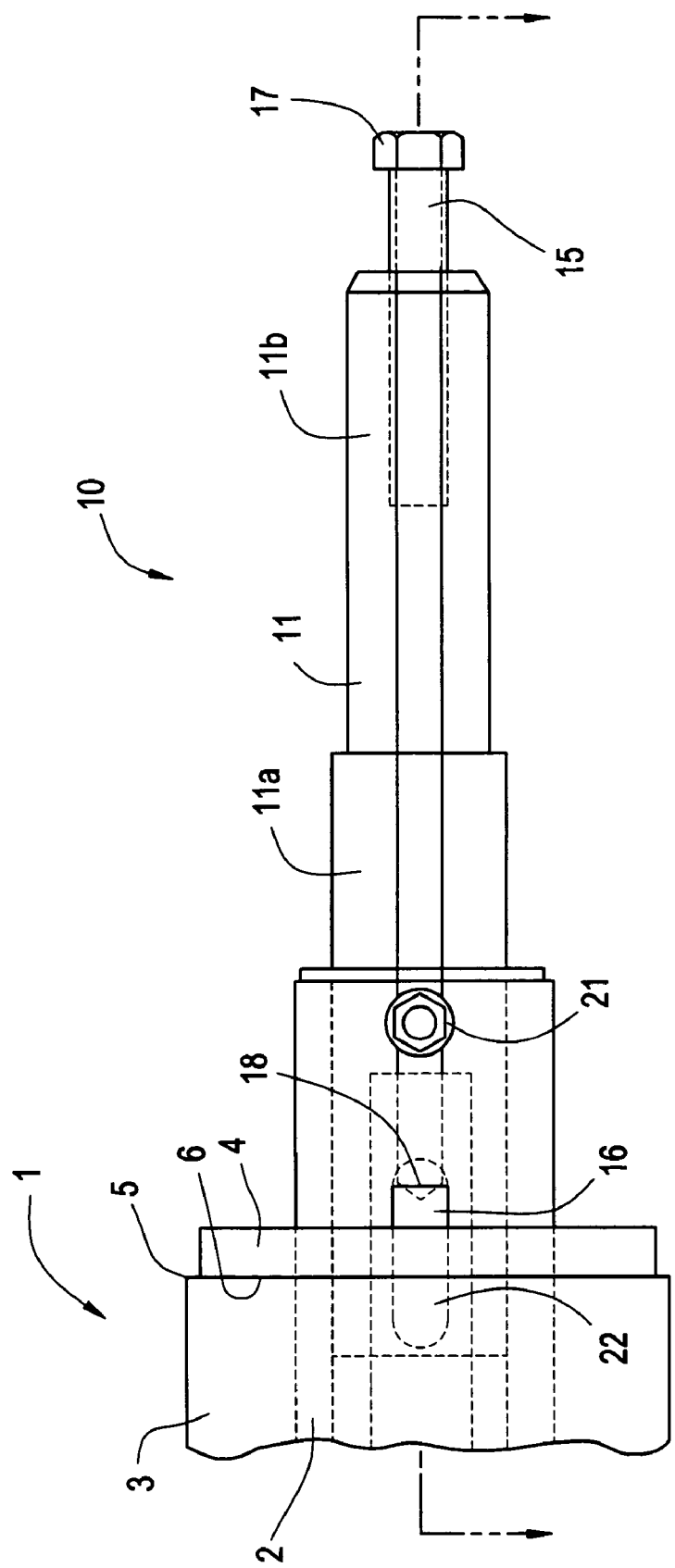
FIG. 2 is a view taken along the lines 2—2 of FIG. 1.

At an external end of the shaft 11, the rod 15 can have a rod head 17. At the opposite, or internal end of the shaft, the rod 15 can have a tapered end 18. This tapered end 18 can engage the compression pin 16 at an indentation 19 in the compression pin 16. The indentation 19 may be sized so as to snugly conform with the tapered end 18. For securely positioning the rod 15 in place within the shaft 11, there can be used a setscrew 21 which may serve as a locking means for the rod 15. During compressive movement of the compression pin 16 toward the fiber cover 3, the pin 16 will move against the outer face of the end plate 4 within an end assembly slot 22 (FIG. 2). This slot 22 is provided in part by a shaft aperture 23 within the shaft 11 and in part by a mandrel aperture 24 within the mandrel 2. The shaft aperture 23 is coincident with the mandrel aperture 24. The compression pin 16 can have a snug fit within this slot 22.

Referring then to FIG. 2, there is depicted a roll 1 and a roll end assembly 10. The roll 1 has a fiber cover 3 over a mandrel 2. The side outer face 5 of the further cover abuts against the inner face 6 of the end plate 4. The mandrel 2 extends in the depicted end assembly outwardly beyond the end plate 4. The shaft 11 of the roll end assembly 10 may be segmented, as depicted in the figure, such as into an inward section 11a and an outward shaft 11b. A preponderant amount of the inward section 11a can be housed within the hollow mandrel 2.

Housed predominantly within the shaft 11 is the rod 15 that terminates outwardly from the fiber cover 3 in a rod head 17. Inwardly toward the fiber cover 3 the rod 15 has a tapered rod end 18. This tapered rod end 18 engages an indentation 19 (FIG. 1) of a compression pin 16. The compression pin 16 can move axially within a slot 22 comprised of an outer mandrel aperture 24 (FIG. 1) and a coinciding interior shaft aperture 23 (FIG. 1). For positioning the rod 15 in place within the shaft 11, there can be used a setscrew 21.

In operation, the inner face 6 of the end plate 4 is in engagement against the outer face 5 of the fiber cover 3. Also, the compression pin 16 can be set in firm engagement against the outer face 7 of the end plate 4. This firm engagement can be obtained by releasing any locking means such as a setscrew 21, then firmly pressing the tapered rod end 18 into the indentation 19 of the compression pin 16. Where the rod 15 has external threading (not shown) engaging internal threading (not shown) of the shaft bore hole 14, such a firm compression between the rod 15 and the compression pin 16 can be achieved by rotating the rod head 17. When suitable compression is achieved, the rod 15 can then be set in place by means of the setscrew 21. As operation of the roll 1 is continued and the fiber cover 3 requires recompression, such can be easily achieved by repeating the steps as hereinabove outlined.

Figure 3:
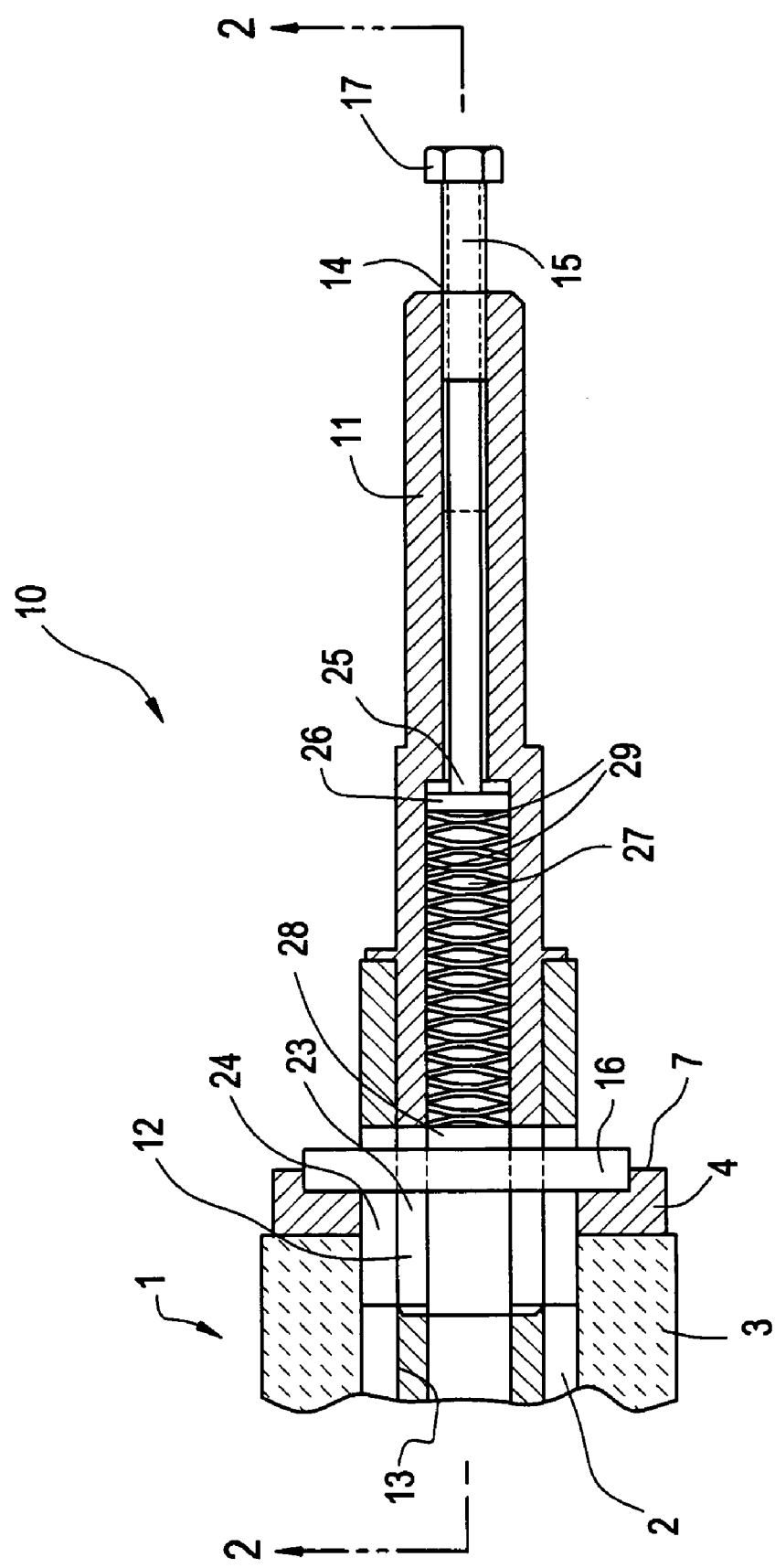
FIG. 3 is a view in section of an alternative embodiment of a portion only of an insulating roll having an end assembly of the present invention that includes spring compression means that is substantially housed within an axial borehole of an end shaft.

In FIG. 3, then, there is depicted an alternative embodiment of the present invention of a roll end assembly 10 having a roll 1 with a fiber cover 3 over a mandrel 2. The roll end assembly comprises a shaft 11. The shaft 11 has an end positioned internally within the mandrel 2 such that the outer surface 12 of the portion of the shaft 11 at this one end can engage the inner surface 13 of the hollow mandrel 2. The shaft 11 has an elongated borehole 14 that extends throughout the shaft 11 in the axial direction of the roll 1. Within the borehole 14 is a rod 15. The rod 15 may be externally threaded (not shown) and the borehole 14 internally threaded (not shown), with the threads engaging, such that rotation of the rod 15 can be utilized to provide a compressive force. Such force can be exerted on a pin 16 serving as a compression element.

At an external end of the shaft 11, the rod 15 can have a rod head 17. At the opposite; or internal end of the shaft, the rod 15 can have a flat base 25. This flat bottom 25 engages with a first plate 26. Below the plate 26 and within the shaft 11 are positioned disc-like springs 27 which occupy a portion of the shaft 11 below the plate 26. The word 'disc' is used herein to refer to cone or cup-shaped springs. However, any shape which will flatten when compressed can be suitable. The springs 27 in combination with the rod 15 and first 26 and second 27 plates serve as compressive means. The springs 27 are supported within the shaft 11 on their outside diameter 29 within the shaft 11. Immediately above and abutting the compression pin 16 is a second plate 28 which engages the springs 27. While the shaft 11 of FIG. 3 is depicted as having approximately 26 springs 27 contained therein, it is contemplated that such springs may be established so as to provide a plurality of springs, e.g., on the order of from 1 to 30 or more, and preferably as many springs 27 as possible. These springs 27 provide a constant compression force on the compression pin 16, thereby reducing the effects of compression set and maintaining the cover 3 in constant compression.

Figure 4:
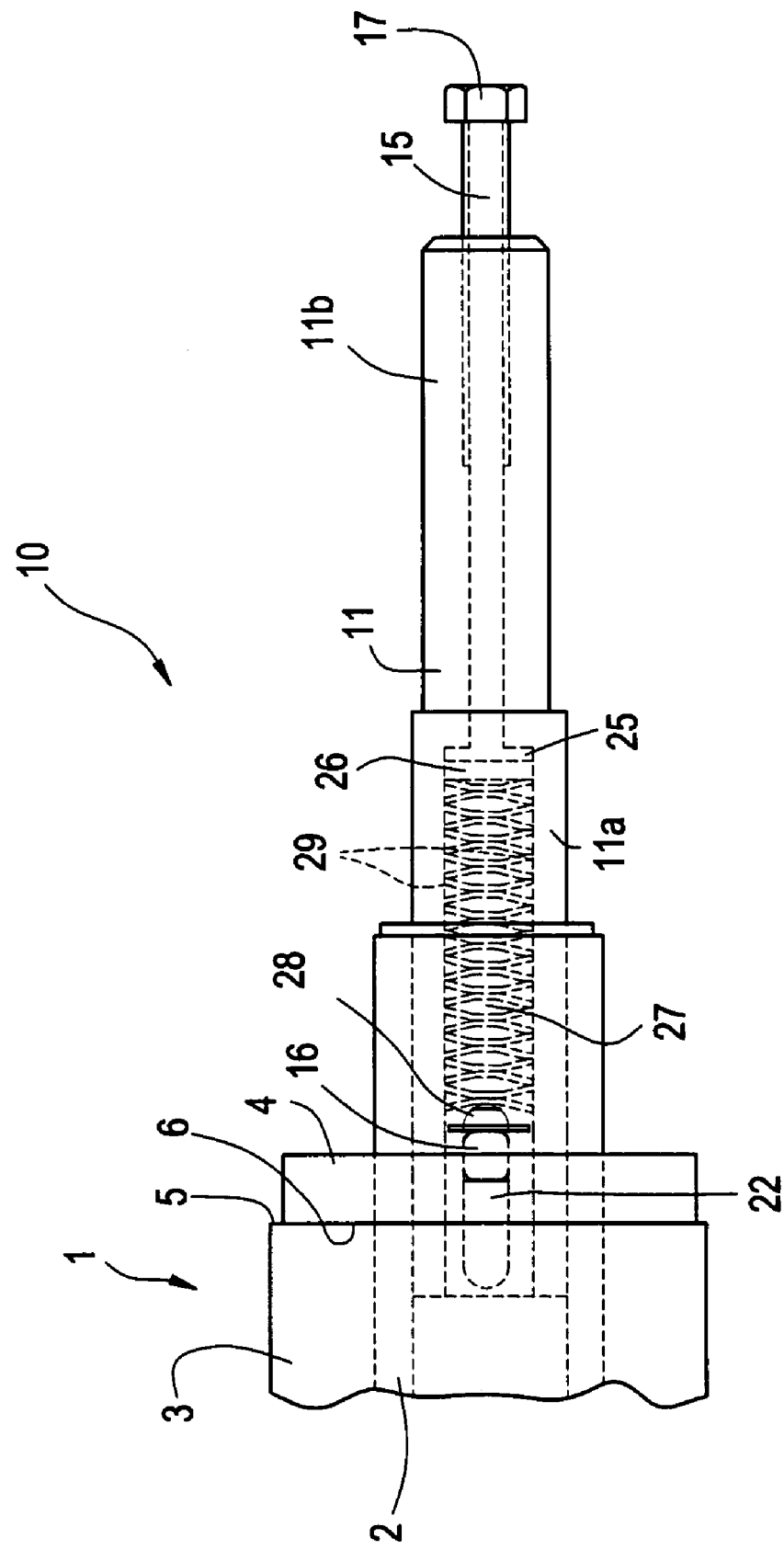
FIG. 4 is a view taken along the lines of 2—2 of FIG. 3.

Referring to FIG. 4, there is shown a roll 1 and a roll assembly 10. The roll 1 consists of a fiber cover 3 over a mandrel 2. The side outer face 5 of the fiber cover 3 abuts against the inner face 6 of the end plate 4. The mandrel 2 extends in the depicted end assembly 10 outward beyond the end plate 4. The shaft 11 of the roll end assembly 10 may be segmented, as depicted in the Figure, such as into an inward section 11a and an outward shaft 11b. A preponderant amount of the inward section 11a can be housed within the hollow mandrel 2.

Within the shaft 11 is the rod 15 that terminates outwardly from the fiber cover 3 in a rod head 17. At an end of the rod 15 opposite the rod head 17, the rod 15 terminates in an essentially flat end 25. Immediately below the end 25 of the rod 15 is a first plate 26. Housed within the shaft 11 and between the first plate 26 and a second plate 28 are the disc springs 27. A compression pin 16 engages the second plate 28 below the second plate 28. The compression pin 16 can move axially within a slot 22 comprised of an outer mandrel aperture 24 (FIG. 3) and a coinciding interior shaft aperture 23 (FIG. 3).

In a roll end assembly 10 including the disc springs 27, the disc springs are inserted into the shaft 11 through slot 22. The second plate 28 is then positioned between the springs 27 and the compression pin 16. The compression pin 16 is then set in firm engagement against the outer face 7 of the end plate 4 and the second plate 28. This firm engagement can be obtained by firmly pressing the rod end 25 against the first plate 26, which in turn compresses the springs 27 against the second plate 28. The second plate 28 pushes on the compression pin 16. Where the rod 15 has external threading (not shown) engaging internal threading (not shown) of the shaft bore hole 15, the springs 27 may be further compressed by rotating the rod head 17.

In general, the parts of the end assembly other than the fiber cover, but which can include the mandrel, will be metal parts for rigidity. However, it is contemplated that other materials, e.g., ceramic setscrews, may be serviceable. Where metal parts are used, such will generally be steel parts, such as stainless steel parts, but may also be of nickel or iron. The disc springs 27 of the present invention may also be metallic, and useful metals include heat-treated spring steel. It is to be understood that the end plate 4 may be any of such plates as find service with refractory fiber-based rolls that can be used industrially, such as in sheet glass or other conveying applications. Also, the compression pin 16 may take other forms. The tapered rod end 18 can then be sized so as to engage the central aperture of the pin 16. Where a tapered rod 15 is used for the compression means, the tapered end 18 may engage any of a dimple, slot, groove or the like as the indentation 19. Such indentation 19 can be hardened, as by metal hardening of the indentation 19, so as to reduce or eliminate any potential seizing of the tapered rod end 18 in the indentation 19. Moreover, other engagement devices between the pin 16 and the rod 15 such as a ball and socket configuration can be useful for appropriately engaging the rod 15 with the pin 16. Such means of engagement should be configured with the thought in mind of maintaining the compression element, e.g., a compression pin 16, in firm engagement so as not to move in a radial direction, that is, up and down for the assembly of FIG. 1, in relation to the roll 1. It can be appreciated that rigidity against axial movement, i.e., inward or outward movement for the assembly of FIG. 1, may be achieved by a ball and socket engagement assembly as well as other assemblies. Such prevention of inward and outward movement can also be achieved by means of the setscrew 21.

It is also contemplated that means other than a threaded rod 15 and a threaded borehole 14 may be serviceable for achieving suitable pressure. For example, the rod 15 may be notched and the notches may cooperate with a locking device having a mechanical catch or detent that engages the notches in the manner of the setscrew 21. Other similar variations for the rod 15 and setscrew 21 include an apertured rod and pin for use with the apertures, or holes, in the rod. In general, the word 'outwardly' is used herein in reference to an axial direction away from the fiber cover 3. Conversely, the word 'inwardly' is used herein for the axial direction toward the fiber cover 3. Such words are used herein for convenience and are not to be construed as limiting the invention.

There may be utilized internal cooling within the hollow mandrel 2. This can be achieved by means of a circulating fluid, which for economy is preferably water or air. It is contemplated that the fluid will enter and exit the mandrel 2 from the end of the roll 1 opposite from the end having the end assembly 10. Although certain shapes have been depicted in the figures for the representative end assembly 10 depicted therein, it is to be understood that other shapes are contemplated. For example, the cross section of the shaft 11 is shown as circular, but may as well at least in part be elliptical, square, or hexagonal shaped.

What is claimed is:

1. A roll structure having a fiber-containing roll cover over a mandrel, which roll structure has at least one end assembly comprising:
    an end plate pressed against said fiber-containing roll cover, wherein said end plate is an at least substantially circular end plate having a flat major face pressed against an end face of said fiber-containing roll cover;
    a compression element spaced apart from said roll cover by said end plate and abutting against said end plate;
    shaft spaced apart from said roll cover on a side of said end plate opposite said roll cover; and
    elongated compression means at least substantially housed within said shaft which compression means exerts pressure against said compression element, wherein said compression element has an indentation in a face opposite the face pressed against said end plate and said elongated compression means engages said compression element in said indentation.

2. A roll structure having a fiber-containing roll cover over a mandrel, which roll structure has at least one end assembly comprising:
    an end plate pressed against said fiber-containing roll cover, wherein said end plate is an at least substantially circular end plate having a flat major face pressed against an end face of said fiber-containing roll cover;
    a compression element spaced apart from said roll cover by said end plate and abutting against said end plate;
    shaft spaced apart from said roll cover on a side of said end plate opposite said roll cover;
    elongated compression means at least substantially housed within said shaft which compression means exerts pressure against said compression element wherein said compression element is a pin and has an indentation in a face opposite the face pressed against said end plate, said indentation being a slot in said pin, and said elongated compression means has a tapered end engaging said slot and engages said compression element in said indentation.

3. A roll structure having a fiber-containing roll cover over a mandrel, which roll structure has at least one end assembly comprising:
    an end plate pressed against said fiber-containing roll cover, wherein said end plate is an at least substantially circular end plate having a flat major face pressed against an end face of said fiber-containing roll cover;
    a compression element spaced apart from said roll cover by said end plate and abutting against said end plate;
    shaft spaced apart from said roll cover on a side of said end plate opposite said roll cover;
    elongated compression means at least substantially housed within said shaft which compression means exerts pressure against said compression element, wherein said compression element is a pin and has an indentation in a face opposite the face pressed against said end plate, said indentation being a socket and said compression means has a ball engaging said socket.

4. A roll structure having a fiber-containing roll cover over a mandrel, which roll structure has at least one end assembly comprising:
    an end plate pressed against said fiber-containing roll cover, wherein said end plate is an at least substantially circular end plate having a flat major face pressed against an end face of said fiber-containing roll cover;
    a compression element spaced apart from said roll cover by said end plate and abutting against said end plate;
    shaft spaced apart from said roll cover on a side of said end plate opposite said roll cover;
    elongated compression means at least substantially housed within said shaft which compression means exerts pressure against said compression element wherein said compression element is a pin and has an indentation in a face opposite the face pressed against said end plate and said pin is positioned within a slot of said roller end assembly.

* * * * *